United States Patent
Jenski, Jr. et al.

[11] Patent Number: 6,131,613
[45] Date of Patent: Oct. 17, 2000

[54] NOISE SUPPRESSOR

[75] Inventors: Gary M. Jenski, Jr., Jackson; Jeffrey C. Shiery, Parma, both of Mich.

[73] Assignee: Aeroquip Corporation, Maumee, Ohio

[21] Appl. No.: 08/703,647

[22] Filed: Aug. 27, 1996

Related U.S. Application Data

[60] Provisional application No. 60/024,591, Aug. 26, 1996.

[51] Int. Cl.[7] .................................................. F16L 55/04
[52] U.S. Cl. .............................. 138/30; 138/26; 220/720
[58] Field of Search ................................. 138/26, 30, 31; 220/720, 721, 723

[56] References Cited

U.S. PATENT DOCUMENTS

| | | |
|---|---|---|
| 2,609,001 | 9/1952 | Hebard . |
| 2,760,518 | 8/1956 | Peet ............................................ 138/30 |
| 2,841,181 | 7/1958 | Hewitt ........................................ 138/30 |
| 3,063,470 | 11/1962 | Forster ...................................... 138/30 |
| 3,212,602 | 10/1965 | Jones et al. . |
| 3,380,480 | 4/1968 | Bleasdale .................................. 138/30 |
| 3,741,250 | 6/1973 | Mercier ..................................... 138/30 |
| 3,744,527 | 7/1973 | Mercier ..................................... 138/30 |
| 3,948,287 | 4/1976 | Sugimura et al. ........................ 138/30 |
| 4,628,964 | 12/1986 | Sugimura et al. ........................ 138/30 |
| 4,638,838 | 1/1987 | Richard et al. . |
| 4,732,176 | 3/1988 | Sugimura .................................. 138/30 |
| 4,759,387 | 7/1988 | Arendt ....................................... 138/30 |

FOREIGN PATENT DOCUMENTS 38 42 298 A1  6/1990  Germany .

OTHER PUBLICATIONS

Noise Control in Hydraulic Systems brochure by Vickers, pp. 1–13, fig. 9, 1992.
International Search Report in PCT/US97/14954 corresponding to this U.S. patent application.

*Primary Examiner*—Patrick F. Brinson
*Attorney, Agent, or Firm*—Emch, Schaffer, Schaub & Porcello, Co., L.P.A.

[57] ABSTRACT

A noise suppressor device for absorbing pulsating fluids is disclosed. A noise suppressor device has a housing which defines an axially extending bore. A resilient bladder is coaxially positioned in the bore. A spool assembly is coaxially positioned within the bladder. The spool assembly has an inner spool layer and an outer spool layer which coaxially surrounds the inner spool layer. The inner spool layer and outer spool layers each define a plurality of perforations extending therethrough. The perforations in the outer spool layer are offset from the perforations in the inner spool layer such that a direct line of sight through the first perforations and second perforations is prevented.

10 Claims, 2 Drawing Sheets

NOISE SUPPRESSOR

This application claims benefit of Provisional Application 60/024,591 filed Aug. 26, 1996.

TECHNICAL FIELD

The present invention relates to a fluid impulse dampener, or noise suppressor. In particular, the present invention relates to a noise suppressor has an improved bladder design and bladder support spool.

The present invention is especially useful in suppressing noise in various hydraulic systems. In preferred embodiments, the noise suppressor is positioned in the hydraulic system near a pump outlet.

BACKGROUND OF THE INVENTION

Noise suppressors are used in various hydraulic systems to compress or dampen the pulses of fluid which are flowing and pulsing through the hydraulic system. The pulses (or changes in fluid pressure) in the fluid flow cause wear on hydraulic systems. One type of noise suppressor comprises a housing having a pressure chamber defined between a flexible bladder and an interior surface of the housing. A pressurized gas is supplied to the pressure chamber. The interior of the bladder defines a fluid receiving chamber. The bladder is coaxially positioned over a tubular support or spool in the chamber. The support has radially extending perforations or holes. The fluid chamber receives the flow of fluid moving through the hydraulic system. The compressibility of the pulsed fluid is achieved as the fluid passes through the fluid chamber as follows: the peak of pulsing fluid passes out through the holes in the support and pushes against the bladder. The bladder expands into the pressure chamber. The pressurized gas on the opposite side of the bladder exerts a counter force on the bladder, thus minimizing or dampening the peak of the fluid pulse. The gas pressure pushes or acts against the bladder causing the bladder to be forced against the support spool. The pulsations of the fluid passing through the housing are absorbed or dampened in the fluid chamber due to the deflections (expansions and contractions) of the bladder and a consequent compression of the gas present in the pressure chamber.

The noise suppressor housings must also be adequately sealed to withstand the normal gas charge pressures, which are typically in the range of approximately 2000–3000 psi. The pulsations of the fluid cause the bladder to expand and contract and the bladder moves in the housing. In the past, it has been difficult to adequately seal the bladder in the housing of the noise suppressor so that fluid does not leak from the edges of the bladder into the gas pressure chamber and/or from the noise suppressor housing.

In addition, in currently used bladder-type noise suppressors, the normal gas charge pressures and the high temperatures of the fluids passing through the noise suppressors cause damage to the bladder. The bladder is under constant expansion and contraction pressures. Portions of the bladder come into repeated contact with the support stool. The bladder wears out at the areas on the bladder where the bladder contacts the spool. Portions of the bladder are removed from these contact areas due to the highly repetitive nature of the pulsing cycles the fluid flowing through the noise suppressor. In particular, the portions of the bladder adjacent the holes in the spool are prematurely worn or torn-away. That is, the edges of the holes in the spool wear away at the bladder causing the bladder to prematurely wear out and fail.

Previous attempts to prevent damage to the bladder have included the U.S. Pat. No. 4,759,387 which placed a helical wave band between a spool and a diaphragm. However, the diaphragm was still subject to undue wear. Other attempts include U.S. Pat. No. 4,628,964 which used a supporting cylinder comprised of a plurality of wire nets over a reinforcing cylinder. However, these previous attempts do not have sufficient durability needed in many types of hydraulic systems and the helical bands and wire nets tend to deform over time due to repeated exposure to pulsing fluids, thereby decreasing the effectiveness of the noise suppressors.

Therefore, there is a need for a noise suppressor which overcomes the above-described drawbacks and which has increased durability.

DISCLOSURE OF THE INVENTION

The present invention is directed to an improved noise suppressor. The present invention reduces wear on hydraulic system and is easily installed in existing hydraulic systems.

The noise suppressor has a longitudinally housing which defines an axially extending bore. A bladder is coaxially positioned in the bore. The bladder is supported within the bore by a spool assembly. In preferred embodiments, the bladder is made of an elastic material such as a durable EPR or rubber-type material which results in extremely long service life and requires minimal servicing.

The spool assembly is coaxially positioned within the bladder. The spool assembly is preferably a spool type device which defines a longitudinally extending bore. The bore in the spool assembly receives the fluid flowing through the hydraulic system. When pulses or changes in fluid pressure occur, the spool assembly provides a means for the fluid to flow into the bladder cavity.

The spool assembly of the present invention comprises an inner spool layer and an outer spool layer which is coaxially positioned over the inner spool layer. In a preferred embodiment, the inner and outer spool layers are comprised of a suitably strong material such as corrosion resistant metals. In especially preferred embodiments, the inner spool layer comprises an aluminum alloy while the outer spool layer comprises a stainless steel material.

The inner spool layer defines a plurality of openings or perforations which extend radially from an inner surface to an outer surface of the inner spool layer. In a preferred embodiment, the inner spool layer has a plurality of evenly spaced perforations extending therethrough which define a first pattern. The perforations in the inner spool layer provide sufficient openings for the pulsating fluid to flow into the bladder.

The outer spool layer defines a plurality of openings or perforations which extend radially from an inner surface to an outer surface of the outer spool layer. In a preferred embodiment, the outer spool layer comprises a material having a preferred thickness which is less than the thickness of the inner spool layer. Also, in a preferred embodiment, the outer spool layer has a plurality of evenly spaced perforations which define a second pattern, which second pattern is different from the first pattern of perforations in the inner second layer. The second pattern of perforations in the outer spool layer is staggered so that the perforations in the outer spool layer do not coincide with the perforations in the inner spool layer. That is, in the preferred embodiments, there is not a direct line of sight through the perforations in the outer spool layer and the perforations in the inner second layer.

The present invention is specifically directed to an improved spool assembly having two coaxial layers of perforated support material with a narrow gap in between the layers. The perforations in each layer are offset or staggered such that the fluid flows from perforations in one layer, through the gap and out of the perforations in the other layer. The two adjacent layers of the spool assembly are of a design which reduces wear on the bladder.

The internal diameter of the perforations in the inner spool layer is the same as the diameter of the perforations in the outer spool layer. It is within the contemplated scope of the present invention that the perforations in the inner spool layer and the perforations in the outer spool layer can have a substantially cylindrical shape. In certain embodiments, the perforations in at least the outer spool layer can have a tapered or frustoconical shape. The inventors believe that the offset or staggered configuration of the perforations and the path of travel of the pulsing fluid through the gap from perforations in one spool layer to perforations in the adjacent spool layer tends to transmit the forces generated by the pulsing fluid to the inner and outer spool, rather than mainly to the flexible bladder. The noise suppressor of the present invention thus takes advantage of the entire structure of the noise suppressor, including the spool assembly as well as the bladder, to dampen the forces of the pulsing fluid.

An additional advantage is that it is now possible to provide a noise suppressor device which can have interchangeable outer and/or inner spool layers which allows the noise suppressor device to be customized for the end user and yet allows the manufacturer of the noise suppressor device to maintain a reduced inventory of a specific noise suppressor devices. Further, it is now possible to provide the end use customer with a more specific noise suppressor device especially a tailored to meet the requirements of the end user.

Therefore, one object of the present invention is to provide a noise suppressor device having improved noise dampening characteristics.

It is further object of the invention to provide an improved noise suppression device having a spool assembly which provides an increased useful life to the resilient bladder in the noise suppressor.

BEST MODE OF CARRYING OUT INVENTION

Figure 1:
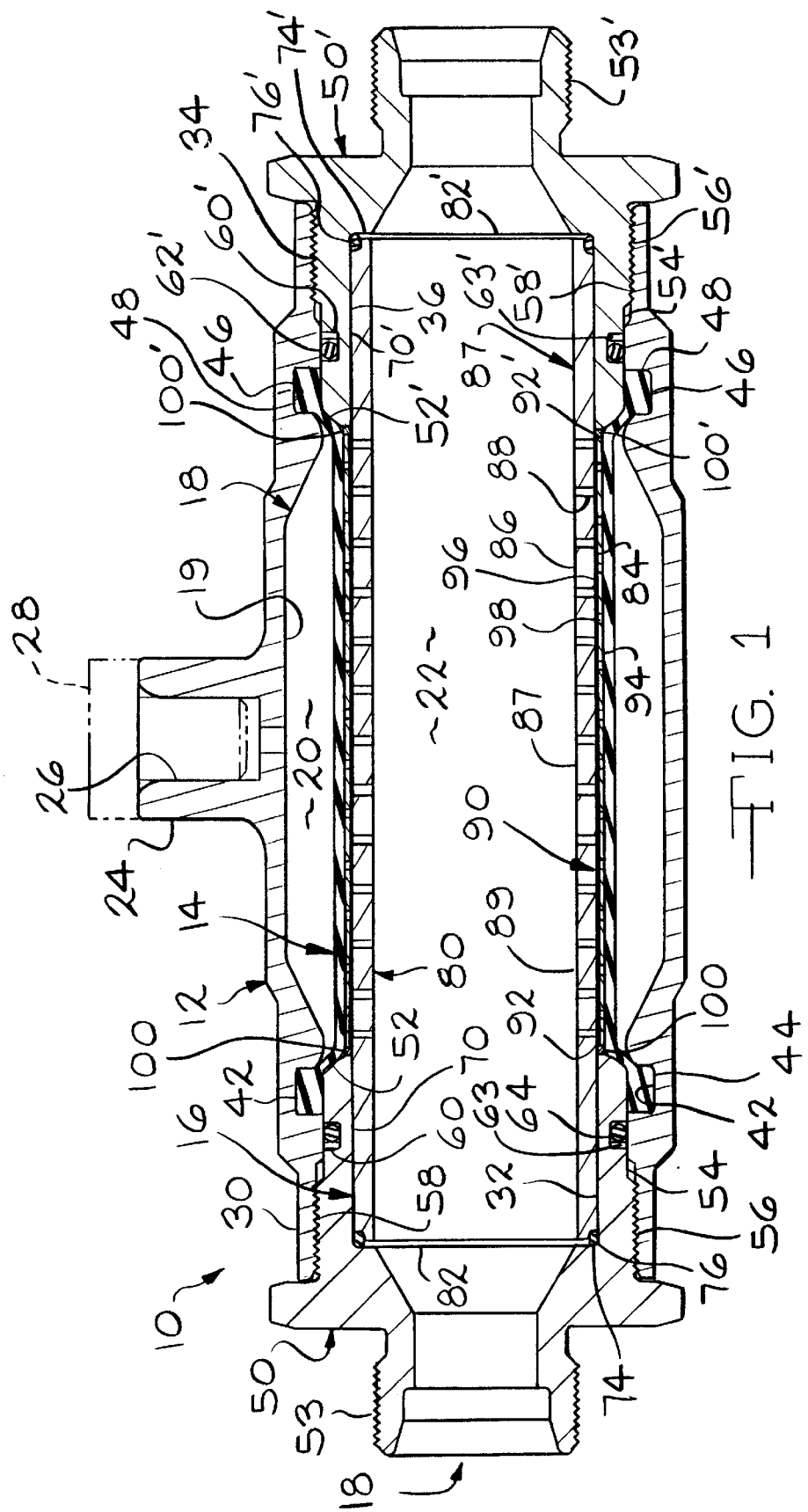
FIG. 1 is a cross-sectional view of a first embodiment of a noise suppressor device.

FIG. 1 generally shows a noise suppressor device 10 comprising a housing 12, a generally hollow flexible bladder 14, and a spool assembly 16. The bladder 14 is coaxially positioned within a longitudinally extending bore 18 in the housing 12. The spool assembly 16 is coaxially positioned within the bladder 14. The shape of the longitudinally extending bore 18 through the housing 12 is defined by an inner surface 19 of the housing 12. The inner surface 19 and the bladder 14 define a pressure chamber 20 while the hollow bladder 14 and the spool assembly 16 define a fluid chamber 22.

The housing 12 further comprises a charging port 24 which defines a radially extending bore 26 for receiving a high pressure charging valve 28, shown in phantom. The radially extending bore 26 is in communication with the pressure chamber 20. A supply of a gas, such as nitrogen, is introduced under pressure to the pressure chamber 20.

The longitudinally extending bore 18 of the housing 12 has a first end 30 having a first interior surface 32 and a second end 34 having a second interior surface 36. The interior surfaces 32 and 36 engagingly receive the spool assembly 16. The housing 12 further defines a first groove or detent 42 for receiving a first end 44 of the bladder 14 and a second groove or detent 46 for receiving a second end 48 of the bladder 14.

The noise suppressor device 10 further includes a first adapter 50 axially positioned within the first end 30 of the housing 12 and a second adapter 50' axially positioned within the second end 34 of the housing 12.

In the embodiment shown, the first adapter 50 comprises a first end 52 which is positioned adjacent the bladder 14 when the adapter 50 is in position in the housing 12 and a second, opposing end 53 which is external to the housing 12 for receiving a hose or other coupling means, not shown. The first adapter 50 has an exterior surface 54 which includes a threaded portion 56 located between the first end 52 and the second end 53. The threaded portion 56 engages a corresponding threaded portion 58 on the interior surface 32 of the first opening 30. The first adapter 50 further includes a detent or groove 60 which circumferentially extends, around the exterior surface 54. The detent or groove 60 receives a packing or sealing member 62, such as an O-ring and washer 63, for sealing the first adapter 50 into the opening 30 of the housing 12.

The first end 52 of the adapter 50 can have an angled or sloped surface to readily engage the first end 44 of the bladder 14. The first end 52 and the exterior surface 54 of the first adapter 50 secure the first end 44 of the bladder 14 in the detent 42 of the housing 12.

The first adapter 50 has an interior surface 70 which defines a flange portion 74. The interior surface 70 of the first adapter 50 axially receives the spool assembly 16. In a preferred embodiment, the spool assembly 16 is held in position against the interior surface 70 of the first adapter 50. In certain embodiments, a packing or sealing member 76 is positioned adjacent the interior flange portion 74 to secure the spool assembly 16 within the first adapter 50.

The noise suppressor device 10 further includes the second adapter 50' which is axially positioned within the second end 34 of the housing 12. In the embodiment shown, the first adapter 50 and the second adapter 50' have substantially the same shape or configuration; however, it is to be understood that it is within the contemplated scope of the present invention that the first adapter 50 and the second adapter 50' can have differently shaped configurations to allow for the installation of different couplings or hoses on the distal ends 53 and 53' of the first adapter 50 and second adapter 50', respectively.

In the embodiment shown, the second adapter 50' comprises a first end 52' which is positioned adjacent the bladder 14 when the second adapter 50' is in position in the housing 12 and a second, opposing end 53' which is external to the housing 12 for receiving a hose or other coupling means, not shown. The second adapter 50' has an exterior surface 54' which includes a threaded portion 56' located between the first end 52' and the second end 53'. The threaded portion 56' engages a corresponding threaded portion 58' on the interior surface 36 of the second opening 34. The second adapter 50' further includes a detent or groove 60' which circumferentially extends around the exterior surface 54'. The detent or groove 60' receives a packing or sealing member 62', such as an O-ring and washer 63', for sealing the second adapter 50' into the second opening 34 of the housing 12.

The first end 52' of the second adapter 50' can have an angled or sloped surface to readily engage the second end 48 of the bladder 14, The first end 52' and the exterior surface 54' of the second end 50' secure the second end 48 of the bladder 14 in the second detent 46 of the housing 12.

The second adapter 50' has an interior surface 70' which defines a flange portion 74'. The interior surface 70' of the second adapter 50' also axially receives the spool assembly 16. In a preferred embodiment, the spool assembly 16 is held in position against the interior surface 70' of the second adapter 50'. In certain embodiments, a packing or sealing member 76' is positioned adjacent the interior flange 74' to secure the spool assembly 16 within the second adapter 50'.

The spool assembly 16 comprises an inner spool layer 80 and an outer spool layer 90. The inner spool layer 80 is coaxially positioned within the bladder 14. The inner spool layer 80 has a first end 82 which is adjacent the first adapter 50 and a second end 82' which is adjacent the second adapter 50'. The first end 82 and second end 82' are held in position against the sealing members 74 and 74', respectively. The inner spool layer 80 has an outer surface 84 and an inner surface 86.

A plurality of radially extending perforations 88 extend through the inner layer 80 from the outer surface 84 to the inner surface 86. The perforations 88 are preferably evenly spaced along at least a center portion 89 of the inner spool layer 80. The perforations 88 are arranged in a first pattern on the inner spool layer 80. In a preferred embodiment, the perforations 88 in the center portion 89 begin at a point adjacent the first end 52 of the first adapter 50 and terminate at a point adjacent the second end 52' and the second adapter 50'. The generally evenly spaced perforations 88 on the inner spool layer 80 provides sufficient openings for changes in fluid pressure to pass through the perforations 88.

The inner surface 86 of the inner spool 80 defines an axially extending bore 87. The axially extending bore 87 is sealed from the interior chamber 20 by the first end 44 and second end 48 of the bladder 14.

The outer spool layer 90 comprises a first end 92 which is adjacent the first adapter 50 and a second end 92' which is adjacent the second adapter 50'. The outer spool layer 90 is coaxially positioned on the inner spool layer 80 and is positioned between the bladder 14 and the inner spool layer 80. The outer spool layer 90 has an outer surface 94 and an inner surface 96.

A plurality of radially extending perforations 98 extend through the outer layer 90 from the outer surface 94 to the inner surface 96. The perforations 98 are preferably evenly spaced along the outer spool layer 90. The perforations 98 are arranged in a second pattern on the outer spool layer 90. The generally evenly spaced perforations 98 on the outer spool layer 90 provides sufficient openings for changes in fluid pressure to pass through the perforations 98.

In certain embodiments, the spool assembly 16 further comprises a first spacer 100 which is coaxially positioned adjacent the first end 92 of the outer spool layer 90 and a second spacer 100' coaxially positioned adjacent the second end 92' of the outer spool layer 90. It is to be understood however, that the present invention is also useful with one spacer positioned adjacent at least one of the ends of the outer spool layer.

In a preferred embodiment, the inner spool layer 80 defines a first thickness or width between the outer surface 84 and the inner surface 86 and the outer spool layer 90 defines a second thickness or width between the outer surface 94 and the inner surface 96. In a preferred embodiment, the thickness or width of the inner spool layer 80 is greater than the thickness or width of the outer spool layer 90.

Figure 2:
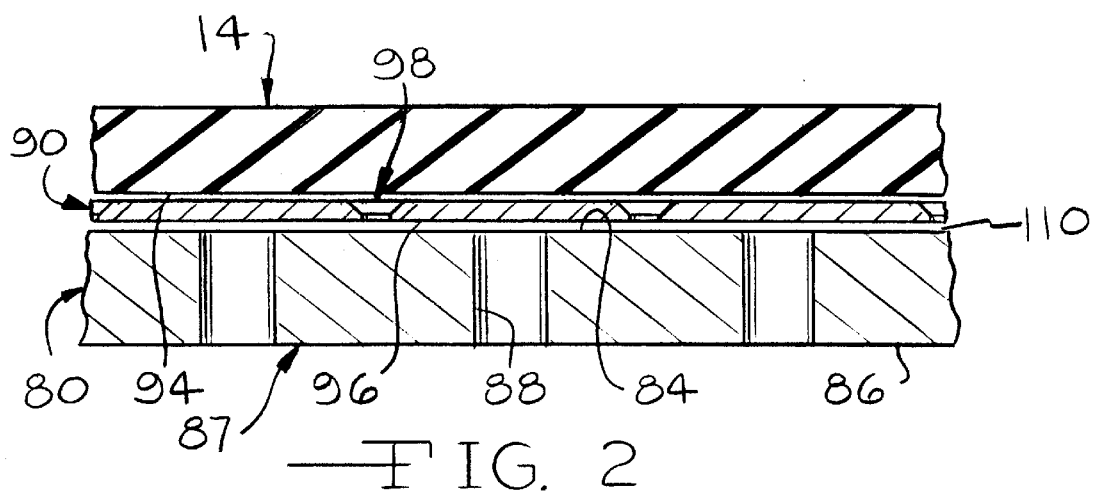
FIG. 2 is a cross-sectional view showing an enlargement of a portion of FIG. 1, showing no, or an equilibrium of, pressure of fluid against one side of a bladder and pressure of gas on an opposing side of the bladder.

The perforations 98 in the outer spool layer 90 define a predetermined pattern such that the perforations 98 are in a staggered configuration with respect to the perforations 88 in the inner spool layer 80. The perforations 98 extend through the outer spool layer 90 such that each perforation 98 is adjacent a portion of the inner spool layer 80. The perforations 88 extend through the inner spool layer 80 such that each perforation 88 is adjacent a portion of the outer spool layer 90. The perforations 88 and 98 are offset, as can be best seen in FIG. 2, such that there is no direct line of sight along a line perpendicular to the plane of the outer surface 94 of the outer spool layer 90.

In a preferred embodiment, the perforations 88 in the inner spool layer 80 define a first, preferred diameter and the perforations 98 in the outer spool layer 90 define a second, preferred diameter. In certain preferred embodiments, the outer spool layer 90 has a thickness ranging from about 0.008 to about 0.03 inches while the inner spool layer 80 is approximately 2–4 times thicker than the outer spool layer 90. The outer spool layer 90 is coaxially positioned over the inner spool layer 80 such that a small gap 110 or clearance exists between the outer spool layer 90 and the inner spool layer 80. The gap 110 defines a fluid flow path for the fluid. The gap 110 is preferably less than the thickness of the outer spool layer 90.

In a preferred embodiment, the width of the gap 110 ranges from about 0.0005 to about 0.0035 inches. The gap 110 provides a tortuous path for the fluid to flow from the axial bore 87 through the perforations 88, through the gap 110, through the perforations 98, and finally contacting the bladder 14. In operation, any fluid flowing through the noise suppressor device 10 will substantially fill the gap 110 between the outer spool layer 90 and inner spool layer 80.

When fluid flows through the axial bore 87 in the inner spool layer 80, the fluid also flows through the perforations 88 in the inner spool layer 80, through the gap 110, and through the perforations 98 in the outer spool layer 90. The fluid contacts the bladder 14 causing the bladder 14 to expand or distend into the pressure chamber 20. The gas pressure on the bladder 14 keeps the bladder 14 from expanding too far during peak or pulse periods of fluid passing through the axial bore 87.

The gas in the pressure chamber 20 is compressed, thus dampening or absorbing the forces of the pulsing fluid.

Figure 3:
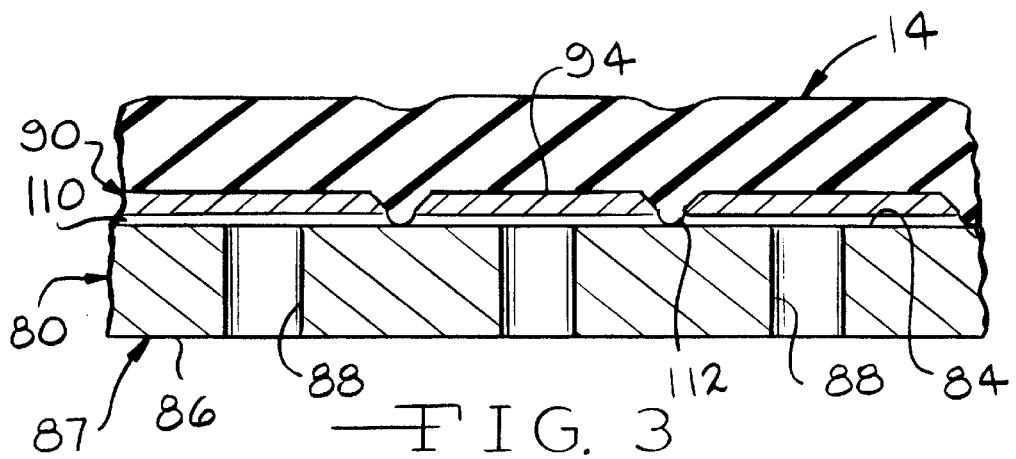
FIG. 3 is a cross-sectional view, similar to FIG. 2, but showing lesser pressure of fluid against a bladder than pressure of gas on an opposing side of the bladder.

As shown in FIG. 3, when a trough or low pulse of fluid passes through the axial bore 87, the bladder 14 is pushed by the gas pressure radially against the outer surface 94 of the outer spool layer 90. Portions 112 of the bladder 14, under pressure from the gas in the pressure chamber 20, extend into the gap 110 between the outer spool layer 90 and the inner spool layer 80. The portions 112 of the bladder 14 contact the outer surface 84 of the inner spool layer 80. Further radial movement or distortion of the bladder 14 is prevented by the outer surface 84. The inner spool layer 80 acts to prevent the material comprising the bladder 14 from being sheared off. The offset or staggered configuration of the perforations 98 and 88 prevent the bladder 14 from being stretched too far.

Figure 4:
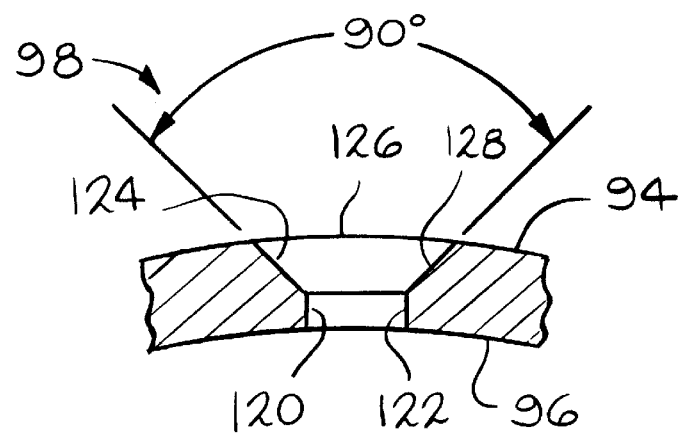
FIG. 4 is a cross-sectional view showing an enlargement of a perforation in an outer spool layer of a spool assembly.

In certain embodiments, the perforations 98 in the outer spool layer 90 can have a countersink-type configuration to further prevent damage to the bladder 141. FIG. 4 shows an enlargement of a perforation 98 in one embodiment of an outer spool layer 90. It is to be understood however, that the perforation 98 can have other configurations and the configuration shown in FIG. 4 provides one example of a suitable shape for a perforation 98. The perforation 98 comprises a first portion 120 which extends from the inner surface 96 of the inner spool layer 90 in a direction toward the outer surface 94. The first portion 120 has a first interior diameter 122. The first portion 120 is generally perpendicular to a plane defined by the inner surface 96. The perforation 98 defines a second portion 124 which is in coaxial alignment with the first portion 120. The second portion 124 extends from the first portion 120 to the outer surface 94 of the outer spool layer 90. The second portion 124 has a second interior diameter 126 which is greater than the first interior diameter 122 of the first portion 120. The second portion 124 has a generally tapered or frustoconical shape, as defined by at least one side wall 128. The second portion 124 defines a countersink-type shape which, in certain preferred embodiments, has an approximately 90° angle as defined by the side wall 128. The second portion 124 further prevents shearing or tearing of the bladder 14 when the bladder 14 is pulled against the outer spool layer 90.

While the invention has been described in terms of various preferred embodiments, the skilled artisan will appreciate the various modifications and substitutions, omissions and changes which may be made without departing from the spirit thereof. Accordingly, it is intended that the scope of the present invention be defined solely by the scope of the following claims including the equivalents thereof.

We claim:

1. A noise suppressor device comprising:

a housing defining an axially extending bore;

a bladder coaxially positioned in the bore;

a spool assembly coaxially positioned in the bladder, the spool assembly consisting of an inner spool layer and an outer spool layer which axially surrounds the inner spool layer;

the inner spool layer defines a plurality of first perforations extending therethrough in a first pattern and the outer spool layer defines a plurality of second perforations extending therethrough in a second pattern; and, the first perforations in the inner spool layer being non-aligned from the second perforations in the outer spool layer wherein an unobstructed direct line of sight through the first perforations and second perforations is prevented, and wherein a unobstructed gap is defined between the inner spool layer and the outer spool layer, the gap defining a tortuous path between the first perforations in the inner spool layer and the second perforations in the outer spool layer.

2. The noise suppressor device of claim 1, wherein the first perforations in the inner spool layer have a first diameter and the second perforations in the outer spool layer have a second diameter, the first diameter of the first perforations in the inner spool layer being substantially the same diameter as the second diameter of the second perforations in the outer spool layer.

3. The noise suppressor device of claim 1, wherein the inner spool layer comprises an aluminum alloy and the outer spool layer comprises a stainless steel material.

4. The noise suppressor device of claim 1, wherein the housing has a first end for receiving a first adapter and a second end for receiving a second adapter, the first and second adapters securing the bladder in the housing.

5. The noise suppressor device of claim 4, wherein the inner spool layer has a first end secured in the first adapter and a second end secured in the second adapter.

6. The noise suppressor device of claim 5, wherein the first perforations in the inner spool layer and the second perforations in the outer spool layer each define a generally cylindrical shape.

7. The noise suppressor device of claim 1, wherein the second perforations in the outer spool layer have a first cylindrical portion in coaxial alignment with a frustoconical shape portion.

8. The noise suppressor device of claim 1, wherein the frustoconical portion of the second perforations is defined by an angled wall having an interior angle of approximately 90°.

9. The noise suppressor device of claim 8, wherein the gap defined between the inner spool layer and the outer spool layer is less than the thickness the outer spool layer.

10. The noise suppressor device of claim 1, wherein the gap ranges from about 0.0005 to about 0.0035 inches.

* * * * *

UNITED STATES PATENT AND TRADEMARK OFFICE
CERTIFICATE OF CORRECTION

PATENT NO. : 6,131,613
DATED : October 17, 2000
INVENTOR(S) : Gary M. Jenski, Jr.
Jeffrey C. Shiery It is certified that error appears in the above-identified patent and that said Letters Patent is hereby corrected as shown below:

In column 8, line 3, delete "an unobstructed" and insert --a--.

In column 8, line 5, delete "a" and insert --an--.

In column 8, Claim 6, line 28, delete "5" and insert --1--.

In column 8, Claim 8, line 36, delete "1" and insert --7--.

In column 8, Claim 9, line 40, delete "8" and insert --1--.

In column 8, Claim 10, line 43, delete "1" and insert --9--.

Signed and Sealed this

Fifteenth Day of May, 2001

*Attest:*

NICHOLAS P. GODICI

*Attesting Officer*   *Acting Director of the United States Patent and Trademark Office*